United States Patent [19]

Nordgren

[11] 3,959,829

[45] June 1, 1976

[54] IMPROVEMENTS IN AND RELATING TO DRY CLOSETS

[75] Inventor: Peter Nordgren, Gustavsberg, Sweden

[73] Assignee: AB Gustavsbergs Fabriker, Gustavsberg, Sweden

[22] Filed: Feb. 14, 1975

[21] Appl. No.: 550,010

[30] Foreign Application Priority Data
Feb. 19, 1974 Sweden.......................... 7402187-4

[52] U.S. Cl........................................ 4/131; 4/111;
4/118; 4/132; 4/133; 110/9 R; 110/9 E
[51] Int. Cl.²......................................... A47K 11/03
[58] Field of Search.............. 4/131, 118, 117, 110,
4/111, 132, 133, 221, 10, DIG. 12; 110/9 R,
9 E; 210/152, 179

[56] References Cited
UNITED STATES PATENTS

| | | | |
|---|---|---|---|
| 3,458,873 | 8/1969 | Nordstedt et al. | 4/131 |
| 3,633,220 | 1/1972 | Lagstrom | 4/131 |
| 3,808,609 | 5/1974 | Andersson et al. | 4/133 |
| 3,840,907 | 10/1974 | Sundberg | 4/111 X |
| 3,843,522 | 10/1974 | Harvey et al. | 210/179 |
| 3,859,672 | 1/1975 | Modig | 4/111 |
| 3,916,456 | 11/1975 | Persson | 4/DIG. 12 X |

OTHER PUBLICATIONS

*Luktfri Miljöriktig enkel,* Mullbank, 1971.
*Humus — Toilet,* Sanitation AG, 1972.

*Primary Examiner*—Richard E. Aegerter
*Assistant Examiner*—James E. Bryant, III
*Attorney, Agent, or Firm*—Hammond & Littell

[57] ABSTRACT

A closet for composting waste material by biological decomposition processes comprises a primary chamber charged with a suitable compound. Means are provided for stirring the bed to break up the bed so as to ensure sufficient aeration of same. There are further separate heat emitting means. The primary chamber has a normally closed discharge port on a side wall. There is provided a secondary chamber constituting a separate unit and the discharge port constitute communication means between the primary chamber and the secondary chamber. Said secondary chamber has separate actuatable heat emitting means.

9 Claims, 3 Drawing Figures

IMPROVEMENTS IN AND RELATING TO DRY CLOSETS

The present invention relates to an arrangement in dry closets of the type comprising a collecting vessel, on top of said collecting vessel an elevatable lid, a primary chamber to be charged with a compound suitably composed to serve the purpose of disintegrating the human excrements and other waste material, separately affectable means to supply heat to said primary chamber in order to bring the compound or the bed to a temperature suitable for its purpose, means to cause such movement of the bed or part thereof, at least intermittently that the aeration of the bed is influenced in a positive way, and means for the ventilation of said primary chamber, a secondary chamber, arranged to receive some of the bed pretreated in said primary chamber.

A number of different types of moldering or composting closets or toilets are known, all of which basically employ the ancient principle of the traditional earth closet, but with the application of different technical means in order to accelerate the biological disintegration process. In this connection the object in view always involves the creation of a toilet of acceptable volume, which can be placed near to or connecting with a dwelling house. The measures taken in order to accelerate the disintegration usually involve the steps of heating or stirring the mouldering compound. Toilets are also known, having means for carrying out a combination of these steps.

An all pervading characteristic of the mouldering closets of the prior art is the drawback that, as a result of the disintegration, they yield a final product containing concentrations of especially coliform and pathogenous bacteria and parasite ovi. In addition said toilets are designed in such a way that, when utilized periodically, as is the case with houses used in one's leisure time, the mouldering compound on account of air permeability is dried up, when the toilet is not used. This causes deterioration in the biological disintegrating conditions, so that the process is slowed down and only slowly resumes its normal velocity in connection with a subsequent period of utilization. A further drawback in connection with hitherto know toilets is the unsuitable concentration of heat generated in the existing heating systems causing local desiccation of the mouldering compound in certain spots. The above in combination with desiccating air passing through the mouldering compound results in an extremely limited capacity of disintegration.

It is an object of the invention to provide a toilet, which under optimum conditions biologically disintegrates faecal matters and urine without development of noxious odors, and which provides a final product which can be safely utilized as an earth improving compound.

According to the invention the primary chamber has its bottom portion entirely enclosed and the secondary chamber relative to the rest of the toilet assembly is a separate unit, which via means, preferably a door in one of the walls of the primary chamber, permits a momentary communication between the primary chamber and the secondary chamber in order to permit transfer of part of the compound in the primary chamber to said secondary chamber, said last mentioned chamber in addition being considerably smaller than the primary chamber and located at the side thereof and being equipped with separately controllable heating means, which are designed in such a way, that the compound, after its transfer to the secondary chamber, can be heated to such a temperature that a pasteurizing effect upon said compound can be obtained.

An embodiment of the invention will now be described in the following, in which connection other characteristics and advantages also will be dealt with. Reference is made to the accompanying drawings, in which.

Figure 1:
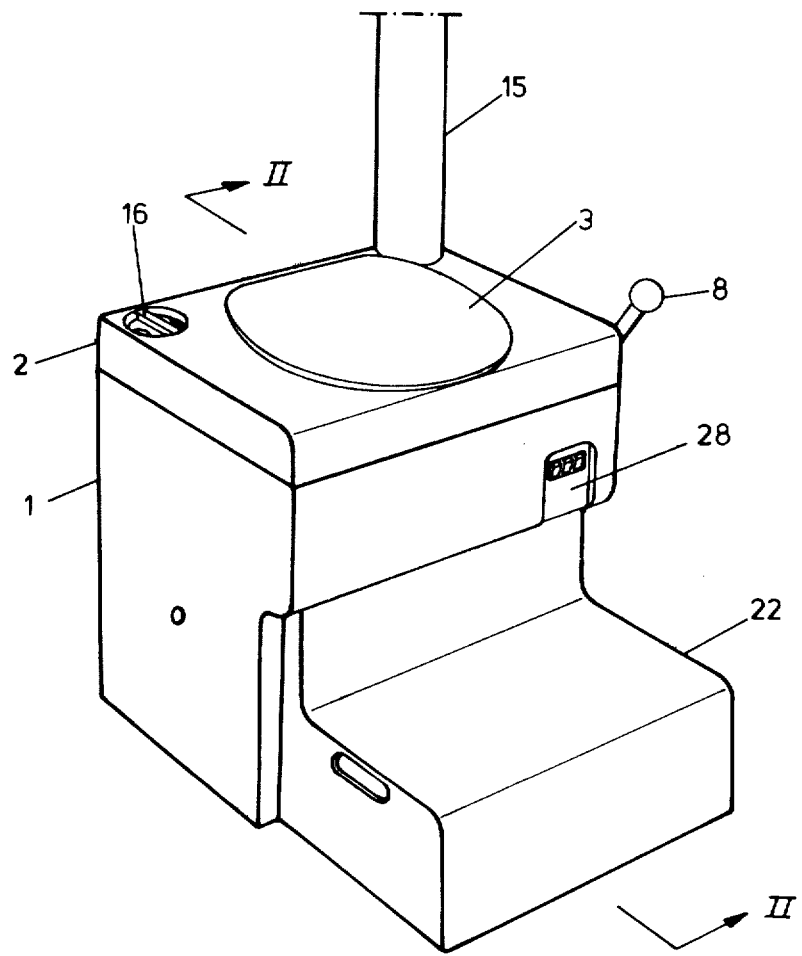
FIG. 1 is a perspective view of the toilet according to the invention.

The toilet according to the invention has a collecting vessel 1 comprising a top portion 2 with an elevatable lid 3, combined with a seat 3', said top portion passing into a bottom portion 4, which serves the purpose of mouldering chamber and which in the following also will be denominated primary chamber or disintegration chamber. Before the use of the toilet is begun, the mouldering chamber 4, having a rounded off smooth bottom 5 of sheet plate or other material, is charged with a special activated mouldering compound 6, the composition of which is well known, and which is not an object of the present invention. Such a mouldering compound is a propitious environment for nitrosoma bacteria, which cause faecal matters to disintegrate. When the toilet is used, the faecal matters will land on the surface of the mouldering compound 6 and the urine via its diagonally arranged distribution means 7 extending along the whole of the greater part of the front side of the collecting vessel will be conveyed to the mouldering compound 6 and will be absorbed by the same. After the use of the toilet the lid 3 is closed, whereafter a stirring means actuated by a bar 8 accessible from the outside mixes together the faecal matters with the mouldering compound 6. In connection therewith the mouldering compound, which by reabsorption has absorbed urine will be mixed with the other mouldering compound in an effective way.

Figure 2:
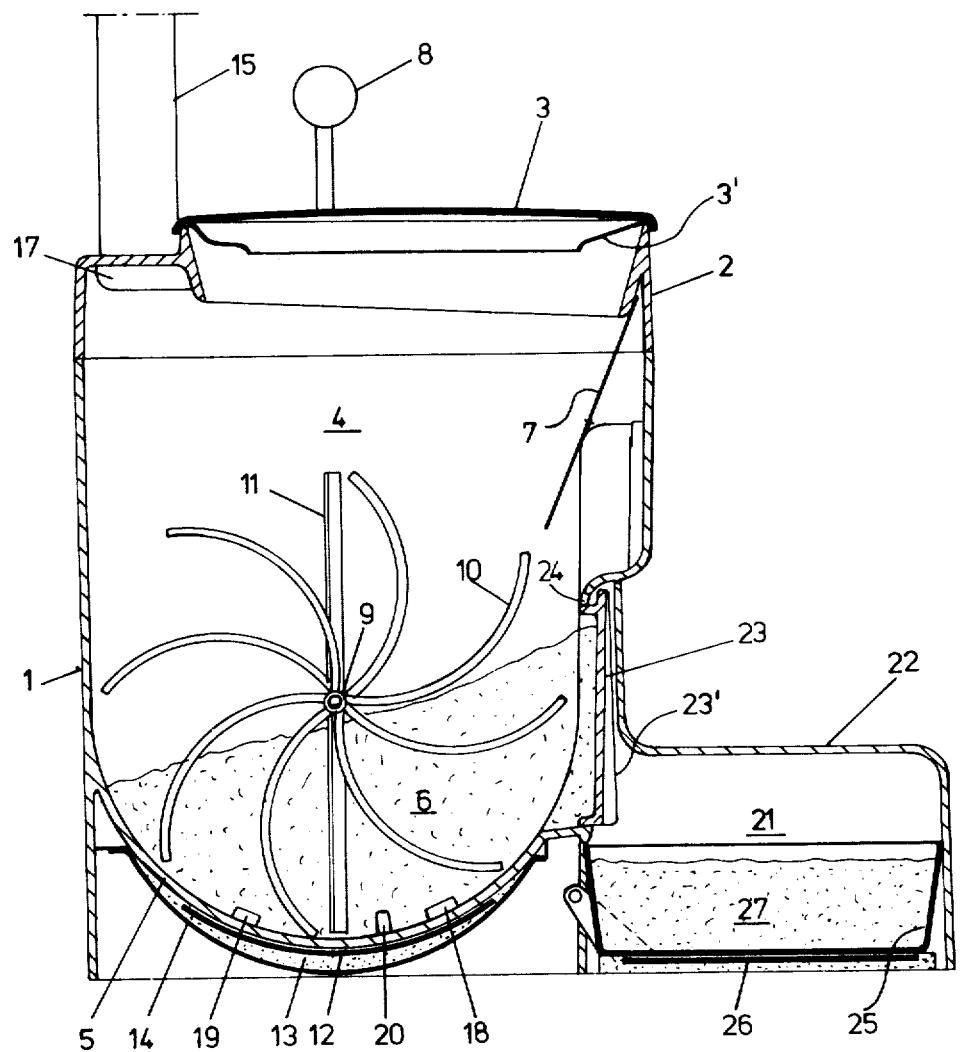
FIG. 2 is a cross sectional view of the toilet along the line II — II of FIG. 1, and FIG. 3 on an enlarged scale illustrates the part serving the purpose of chamber for pasteurization and/or a subsequent composting process.

The stirring means mentioned above can suitably comprise a device described more in detail in the U.S. Pat. 3,859,672, viz. a number of harrow-like pins 10 in rigid or detachable interspaced mounting on a shaft 9 journalled in the end walls of the collecting vessel 1, of which pins at least some during the rotation of the shaft 9 will be at a very short distance from the inner surface of the bottom portion 3; the stirring means are adapted to aerate and tumble the bed material forward in the closet. In the embodiment illustrated in FIG. 2, the respective ends of the shaft 9 are provided with knife-like somewhat diagonal means 11, which during the rotation of the shaft 9 are arranged to contact or to be at a short distance from the end walls of the collecting vessel in order to tear off possible deposits from said end walls.

In a stirring means of the kind mentioned or of any other type, the rotation axis, in the present case the shaft 9, is connected with the bar 8, which produce the effect described above.

In order to maintain a temperature in the bed 6 suitable for the microbes causing the disintegration, the mouldering chamber or primary chamber 4 is provided with separately controllable heat emitting means.

In order to obtain the best possible effect, the heat supplied should be distributed as evenly as possible and according to the invention it is suggested that the heat source should comprise one or several electric foils 12 in order to avoid detrimental heating of local spots, said foils being arranged beneath the curved bottom portion 5 in such a manner that the heat is emitted evenly or in a comparatively uniform distribution to the whole or in any case the greater part of said bottom portion.

A layer 13 of insulation is provided underneath the electric foils and a cover plate 14 cooperates with the bottom portion 5 and keeps the electric foils and layer of insulation in place.

On account of the heat supplied by the electric foil, first and foremost the water contained in the urine is evaporated. In order to carry off the water vapour and the gaseous products formed during the disintegration process, the toilet is equipped with a ventilating tube or duct 15, which suitably has its end above the roof of the building, in which the toilet is installed. Air, which besides a slide draft valve 16 (i.e., a valved aperture) in the upper portion 2 also is taken into the mouldering chamber 4 through a slit or an untight fit around the lid 3 of the seat, serves the purpose of transportation medium in this connection. From the mouldering chamber 4 the air is evacuated by means of an exhaust fan 17 through the ventilation tube 15 and said fan creates an underpressure (i.e., a partial vacuum) in the primary chamber 4. In connection with a toilet used by four persons, the fan has a capacity of more than 100 cubic meters of air per hour, to provide a satisfactory change of air, partly for the evacuation of water vapour and other gases, and partly for the supply of oxygen from the aerobic disintegration processes. By such an abundant supply of oxygen the appearance of anaerobic processes is prevented, and by means of the stirring means 9,10 the bed 6 is loosened up, so that the necessary oxygen will get access also to the deeper parts of the bed 6.

When the toilet is in continuous use, mouldering compound is carried to the surface of the bed 6 by means of the stirring means 9,10, whereby the surface layer is dehydrated yielding an improved oxygen apply to the microbes. By means of the heat source 12 a temperature is maintained, which is adapted to an optimum of activity of the microbes in the bed 6. If for some time the toilet has received urine in such a large quantity that the resorption capacity of the bed 6 has been exceeded, liquid is accumulated in the bottom portion 5 of the mouldering chamber, in which case heat source 12 may be insufficient to maintain the desired temperature. In order to avoid such an effect, a thermostat 18 can connect the effect of an additional electric foil forming part of the heat source 12. In connection with such increased heat supply the surplus moisture is evaporated, and the normal temperature is re-established in the bed 6, whereafter the thermostat 18 disconnects the additional effect.

If the toilet should be unused for a period of some duration, the fan can be stopped. On account of the self-draft through the ventilation tube 15 a certain desication on the surface of the bed 6 will anyhow take place, but because of the absence of stirring action, the mouldering compound will retain moisture below its surface and constitute a favourable environment for the microbes. In order to maintain this favourable condition in the bed, the toilet can be provided with an additional thermostat 19 positioned in the disintegration chamber 4 and serving as a protection against overheating. This thermostat 19 disconnects heat source 12, if the temperature in the bed 6 should rise above the one suitable for the microbes as a result of a failing supply of liquid. By this arrangement the mouldering compound maintains an adequate moisture content, and the microbes keep up a high activity until the next period of use, in the meantime being well protected against dehydration due to the disintegration chamber being closed at the bottom.

It is also possible by means of a moisture registration instrument (i.e., a moisture responsive switch) 20 at the bottom of the disintegration chamber 4 automatically to control the fan 17, so that the fan is stopped, when the moisture content is declining, which arrangement protects the mouldering compound from being desiccated. After having been used for an effective period in the order of two months, an accumulation of products of decomposition in the chamber 4 of the toilet according to the embodiment described in the example has taken place, which makes it necessary to remove part of them. The quantity of decomposition waste amounts to about 20 kilos in this connection and is the result of the biological disintegration, the greater part being nutritive salts coming from the urine. The resulting concentration of salt has a retarding effect upon the disintegration process, but does not influence the infectious bacteria.

These bacteria thus have to be neutralized, which according to the invention is suggested to take place by means of a pasteurizing process in a secondary chamber 21 located outside the primary chamber 4.

In the example of embodiment the secondary chamber 21 thus is horizontally displaced relative to the primary chamber 4 and constitutes a separate unit. By removing a housing 22 serving the purpose of foot-rest, which housing has an open side facing the primary chamber 4, a normally closed scuttle, port or door 23 provided with a grip part 23' will be accessible. The door 23 is displaced on guides (not shown) and connects on to the front side of the collecting vessel 1. The secondary chamber 21 and the primary chamber 4 are intercommunicated via an air slit 24, which means that approximately the same pressure, i.e. underpressure, prevails in the primary chamber as in the secondary or pasteurizing chamber. By removing the door 23 the necessary quantity of material can be transferred from the bed 6 to a receptacle 25, the upper edge portions of which are located below a horizontal line defined by the shaft 9. The easiest way to do this is by actuating the bar 8, whereby the pins 10 function as shovels and transport the bottom portion of the bed 6 out of the primary chamber into the receptacle 25, which suitably can be made of stainless steel sheet, which in an excellent manner can resist attacks of the nutritive salts for a very long time. The receptacle 25 can also be made of cheaper material, for example corrugated cardboard, constituting a packet for deposits of single-use type.

When the receptacle 25 has been filled, the door 23 is closed, and the foot-rest box 22 is put back again, whereafter the primary chamber 4 can be charged with new activated mouldering compound, which during the continued use of the toilet becomes admixed with the remaining portion of the bed 6.

By arranging a heating plate 26 or other type of separately affectable heat source at the bottom of the secondary chamber 21, the chamber is heated to such a high temperature that the bed 27 is pasteurized, i.e., it is heated to a temperature of at least 68° C. When the pasteurizing process has been completed, the current supply to the heat source 26 is cut off either manually or by an automatic device. When the bed 27 has cooled down, it can without incurring any risk be deposited on a lawn, on a flowerbed or anywhere else in the open country. The bed 27 transferred to the receptacle 25 can be treated either in the manner just described or be left until next emptying of material from the primary chamber 4 is due.

By connecting foot-rest box 22 very tightly the front of collecting vessel 1 and by evacuating any developing gases from secondary chamber 21 via air slit 24, risk of diffusion of obnoxious odors from the secondary chamber into the ambient atmosphere is eliminated.

Separate connection and disconnection of the heat source 26 as well as of the fan 17 and of the heat source 12 can take place by manual operation from a panel 28 located on the front side of the receptacle-housing 1. By the utilization of an electric foil or electric foils as a heat source 26, a foot-rest box is obtained, which requires little space and which permits a compact design.

Figure 3:
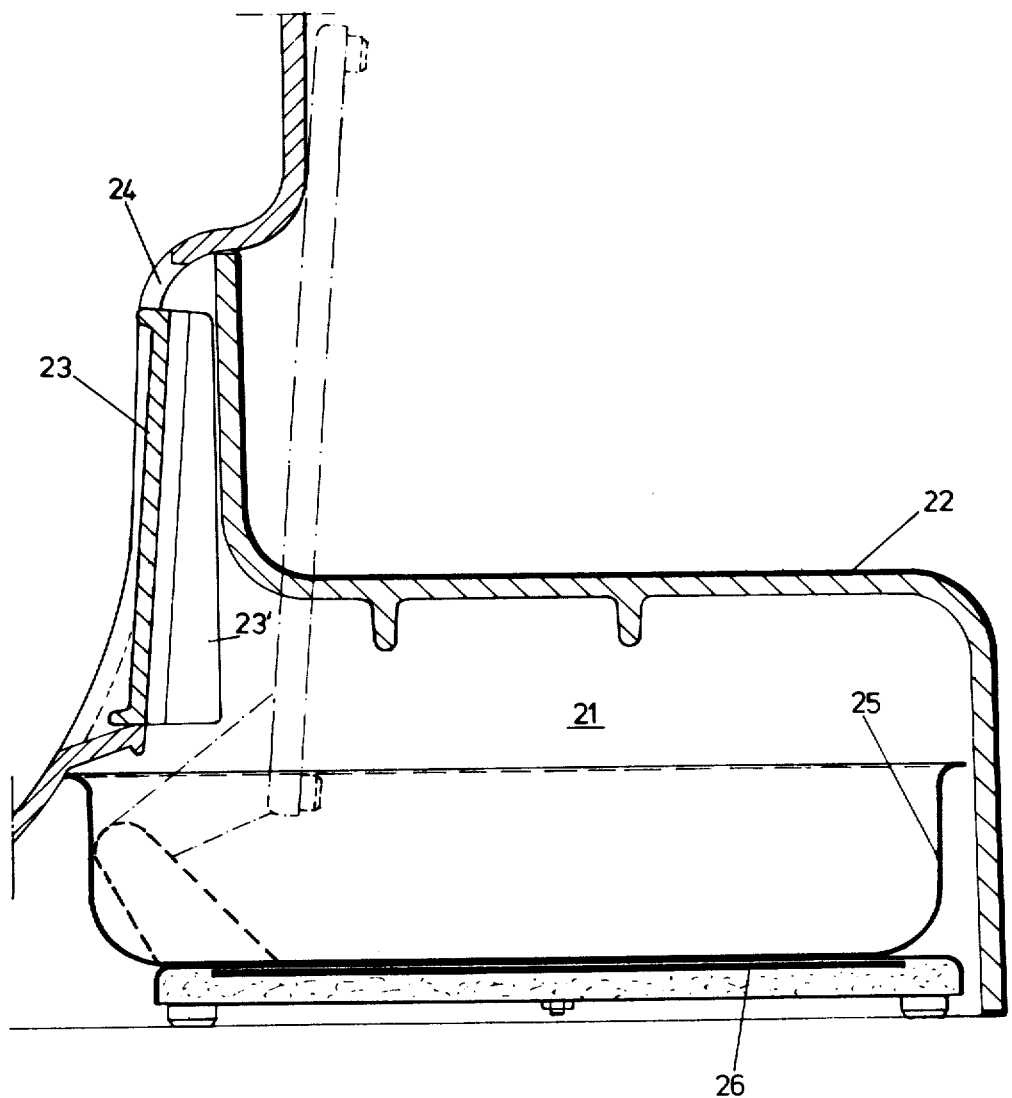

In order to be able in a practical manner to pack and transport a toilet according to the invention, the heat source 26, as is evident from FIG. 3, can be pivotable on hinges from a transportation position, indicated with dashed and dotted lines, to a horizontal position for use.

It is evident that the secondary chamber 21 in principle can be located in any other place in order to perform the cooperation described above with the primary chamber 4. The solution indicated is practical among other things because all functions are concentrated within as compact a space as possible. Analogous thereto a door corresponding to the door 23 can thus instead be made in the bottom plate 5, and the charge from the primary chamber 4 then can take place in vertical direction into a secondary chamber located underneath said door. The function and utilization of the secondary chamber 21 thus is independent of any disintegrating process going on in the primary chamber irrespective of the location of said secondary chamber.

I claim:

1. A closet for the biological decomposition of human feces and urine and for the pasteurization of the decomposition product thereof, which comprises: a collecting vessel having an elevatable lid; a primary chamber forming the lower part of said collecting vessel, said chamber having a wholly closed bottom and being adapted to contain a bed of material adapted to biologically disintegrate feces and urine therein; controllable means adapted to heat bed material in said chamber; means for ventilating said chamber; mechanical means within said chamber adapted to mix feces and urine with said bed material and for aerating and moving the resulting mixture towards a secondary chamber; a removable smaller secondary chamber adjacent to and at substantially the same level as said primary chamber; a normally closed but openable port between said chambers adapted to permit substantially horizontal transfer of bed material from said primary chamber to said secondary chamber; and independently controllable heating means in said secondary chamber adapted to heat bed material in said chamber to pasteurizing temperature.

2. A closet according to claim 1, wherein said secondary chamber is at the front of said closet and has the height of a foot rest-box.

3. A closet according to claim 1, wherein said mechanical means are adapted to tumble said bed material towards the front of said closet, and said secondary chamber is positioned at the front of said closet.

4. A closet according to claim 1, wherein said primary chamber heating means are positioned underneath the bottom of said chamber and are adapted to maintain substantially all of said bed material at approximately the same temperature.

5. A closet according to claim 1, wherein the heating means are electrical foils.

6. A closet according to claim 1, wherein at least one of said heating means is controlled by a thermostat.

7. A closet according to claim 1, wherein said ventilating means is a ventilation duct containing an exhaust fan.

8. A closet according to claim 1, wherein a the top portion of said collecting vessel has a valved aperture adapted to control said ventilation.

9. A closet according to claim 7 wherein the fan is controlled by a moisture responsive switch adapted to turn said fan on when the moisture content of bed material in said primary chamber is high and to cease actuating said fan when said moisture content is low.

* * * * *